United States Patent
Cardenas et al.

(10) Patent No.: US 12,365,152 B2
(45) Date of Patent: Jul. 22, 2025

(54) PHOTONIC ANNEALING OF ELECTRICALLY-CONDUCTIVE THERMOPLASTICS

(71) Applicant: U.S. Army Combat Capabilities Development Command, Army Research Laboratory, Adelphi, MD (US)

(72) Inventors: Jorge A. Cardenas, Durham, NC (US); Nathan S. Lazarus, North Bethesda, MD (US); Harvey H. Tsang, Rockville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 4 days.

(21) Appl. No.: 16/866,396

(22) Filed: May 4, 2020

(65) Prior Publication Data

US 2021/0339488 A1    Nov. 4, 2021

(51) Int. Cl.
*B29C 71/02* (2006.01)
*B29C 64/118* (2017.01)
(Continued)

(52) U.S. Cl.
CPC ............ *B29C 71/02* (2013.01); *B29C 64/118* (2017.08); *B29C 64/30* (2017.08); *B33Y 10/00* (2014.12);
(Continued)

(58) Field of Classification Search
CPC .......... B29C 71/02; B29C 71/04; B33Y 70/00
See application file for complete search history.

(56) References Cited

U.S. PATENT DOCUMENTS

| 5,156,697 A * | 10/1992 | Bourell ............... B23K 26/34 |
| | | 264/497 |
| 8,784,721 B2 | 7/2014 | Philippi et al. |

(Continued)

FOREIGN PATENT DOCUMENTS

| WO | 2008015169 | 2/2008 |
| WO | 2016164729 | 10/2016 |

OTHER PUBLICATIONS

Multi 3D LLC, Electrifi FAQs, 2023, webpage, available at https://www.multi3dllc.com/faqs/, accessed Dec. 18, 2023 (Year: 2023).*

(Continued)

*Primary Examiner* — Andrew D Graham
(74) *Attorney, Agent, or Firm* — Eric B. Compton

(57) ABSTRACT

Photonic annealing is used to treat electrically-conductive thermoplastic. The thermoplastic forms, partially or wholly, a part which may be formed by additive manufacturing, like fused filament fabrication (FFF). The photonic annealing improves part conductivity and also alter, enhance, or give rise to other material properties while taking significantly less time than other conventional post-process methods. For instance, the baseline conductivity of the electrically-conductive thermoplastic material may be on the order of $10^3$ S/m or lower. After the photonic annealing, its conductivity may be raised to the order of $10^4$-$10^5$ S/m or more. This represents an improvement of 10-100× or even more of conductivity of the electrically-conductive thermoplastic compared to electrically-conductive thermoplastic prior to the photonic annealing.

13 Claims, 5 Drawing Sheets

(51) Int. Cl.
*B29C 64/30* (2017.01)
*B33Y 10/00* (2015.01)
*B33Y 30/00* (2015.01)
*B33Y 40/20* (2020.01)
*B33Y 80/00* (2015.01)
*B29K 101/12* (2006.01)

(52) U.S. Cl.
CPC ............... *B33Y 30/00* (2014.12); *B33Y 40/20* (2020.01); *B33Y 80/00* (2014.12); *B29C 2071/022* (2013.01); *B29K 2101/12* (2013.01); *B29K 2995/0005* (2013.01)

(56) References Cited

U.S. PATENT DOCUMENTS

| | | | |
|---|---|---|---|
| 8,876,513 B2 | 11/2014 | Lim et al. | |
| 9,034,417 B2 | 5/2015 | Arancio et al. | |
| 9,126,367 B1* | 9/2015 | Mark | B29C 64/386 |
| 9,453,142 B2* | 9/2016 | Rolland | G03F 7/0757 |
| 9,643,208 B2 | 5/2017 | Schroder et al. | |
| 9,676,209 B2 | 6/2017 | Veis | |
| 9,730,333 B2 | 8/2017 | Li et al. | |
| 10,059,056 B2 | 8/2018 | Church et al. | |
| 10,254,499 B1* | 4/2019 | Cohen | H01R 4/022 |
| 10,611,082 B2* | 4/2020 | Mark | B29C 64/393 |
| 10,682,844 B2* | 6/2020 | Mark | B33Y 50/02 |
| 2002/0105080 A1* | 8/2002 | Speakman | H01L 51/0026 257/749 |
| 2003/0051662 A1* | 3/2003 | Lee | B05D 3/061 118/50 |
| 2003/0175411 A1* | 9/2003 | Kodas | H01G 4/1227 427/58 |
| 2006/0237879 A1* | 10/2006 | Palmer | B33Y 10/00 264/401 |
| 2007/0087564 A1* | 4/2007 | Speakman | H01M 10/0436 438/674 |
| 2014/0036455 A1* | 2/2014 | Napadensky | B29C 64/106 361/748 |
| 2014/0314966 A1 | 10/2014 | Fink et al. | |
| 2014/0321032 A1* | 10/2014 | Lazarus | G01C 25/00 361/679.01 |
| 2015/0181714 A1 | 6/2015 | Ahmed et al. | |
| 2015/0302982 A1* | 10/2015 | Meyer | H01F 21/06 336/105 |
| 2015/0367415 A1* | 12/2015 | Buller | B33Y 70/00 419/53 |
| 2016/0281267 A1* | 9/2016 | Wetzel | C03B 37/028 |
| 2017/0120332 A1* | 5/2017 | DeMuth | B25J 11/00 |
| 2017/0297262 A1* | 10/2017 | Grigorian | B29C 71/04 |
| 2017/0323714 A1* | 11/2017 | Lazarus | H01F 38/14 |
| 2017/0325359 A1* | 11/2017 | Lazarus | H05K 1/0272 |
| 2018/0043618 A1* | 2/2018 | Shemelya | B33Y 10/00 |
| 2018/0079132 A1* | 3/2018 | Giesbers | B29C 64/106 |
| 2018/0087189 A1 | 3/2018 | Wetzel et al. | |
| 2018/0264688 A1* | 9/2018 | Jaker | B29C 64/118 |
| 2018/0272601 A1* | 9/2018 | Erickson | B33Y 40/10 |
| 2019/0077072 A1 | 3/2019 | Wiley et al. | |
| 2019/0242024 A1* | 8/2019 | Lazarus | B29C 64/295 |
| 2019/0284424 A1* | 9/2019 | LeBlanc | C09D 11/104 |
| 2019/0344520 A1* | 11/2019 | Sadeghi | B32B 27/36 |
| 2020/0031040 A1* | 1/2020 | Goredema | H05K 3/102 |
| 2020/0031041 A1* | 1/2020 | Goredema | C09D 11/52 |
| 2021/0178686 A1* | 6/2021 | Erickson | B29C 64/336 |
| 2021/0339488 A1* | 11/2021 | Cardenas | B33Y 80/00 |
| 2022/0250310 A1 | 8/2022 | Hu | |

OTHER PUBLICATIONS

Shaffer, S., Yang, K., Vargas, J., Di Prima, M.A., Voit, W. "On reducing anisotropy in 3D printed polymers via ionizing radiation." Polymer 55, 5969. 2014.

Stansbury, J.W., Idacavage, M.J. "3D printing with polymers: challenges among expanding options and opportunities." Dental Materials 32, 54. 2016.

Hwang, H.J., Oh, K.H., Kim, H.S. "All-photonic drying and sintering process via flash white light combined with deep-UV and near-infrared irradiation for highly conductive copper nano-ink." Scientific Reports 6, 19696. 2016.

Flowers, P.F., Reyes, C., Ye, S., Kim, M.J., Wiley, B.J. "3D printing electronic components and circuits with conductive thermoplastic filament." Additive Manufacturing 18, 156. 2017.

Kim, M.J., Cruz, M.A., Ye, S., Gray, A.L., Smith, G.L., Lazarus, N., Walker, C.J., Sigmarsson, H.H., Wiley, B.J. "One-step electrodeposition of copper on conductive 3D printed objects." Additive Manufacturing 27, 318. 2019.

3Dn-DDM Series product specification sheet. nScrypt Inc. Available online at: https://www.nscrypt.com/wp-content/uploads/2020/02/3Dn-DDM-Series.pdf (document undated; although, it was available prior to the patent application filing).

MakerBot Replicator2 product brochure. MaketBot. Available online at: https://downloads.makerbot.com/replicator2/MakerBot_Replicator2_brochure.pdf (document undated; although, it was available prior to the patent application filing).

Poster titled "Flash Ablation Metallization of Conductive Thermoplastics" displayed at the Flex2020 Conference and Exhibition, San Jose, CA, Feb. 24-27, 2020 (Jorge A. Cardenas, Harvey Tsang, Huayu Tong, Hattan Abuzaid, Katherine Price, Mutya A. Cruz, Benjamin J. Wiley, Aaron D. Franklin, Nathan Lazarus).

Non-Final Office Action in U.S. Appl. No. 17/517,336 dated Aug. 19, 2022.

Xianghui Zeng et al., "Copper inks for printed electronics: a review," Nanoscale, 2022, 14, 16003-16032.

Y. Zheng et al, "A review of conductive carbon materials for 3D printing: Materials, Technologies, Properties and Applications," Materials, 2021, vol. 14, 3911.

A. Arivarasi and R. A. Kumar, "3D printing of copper filament for layered foundation," WSEAS Trans. Electron. 2016, 2016.

Sarah-Jane Potts et al., "Effect of photonic flash annealing with subsequent compression rolling on the topography, microstructure and electrical performance of carbon-based inks," J Mater Sci (2019) 54:8163-8176.

Electrifi Conductive Filament | Multi3D (multi3dllc.com), available at: https://www.multi3dllc.com/product/electrifi/ (© 2024 Multi3D).

R. Colella et al., "Fully 3D-Printed RFID Tags based on Printable Metallic Filament: Performance Comparison with other Fabrication Techniques," 2019 IEEE-APS Topical Conference on Antennas and Propagation in Wireless Communications (APWC), Granada, Spain, 2019, pp. 253-257.

S. Das et al., "Potential for multi-functional additive manufacturing using pulsed photonic sintering," Procedia Manuf., 2015, vol. 1, 366-377.

* cited by examiner

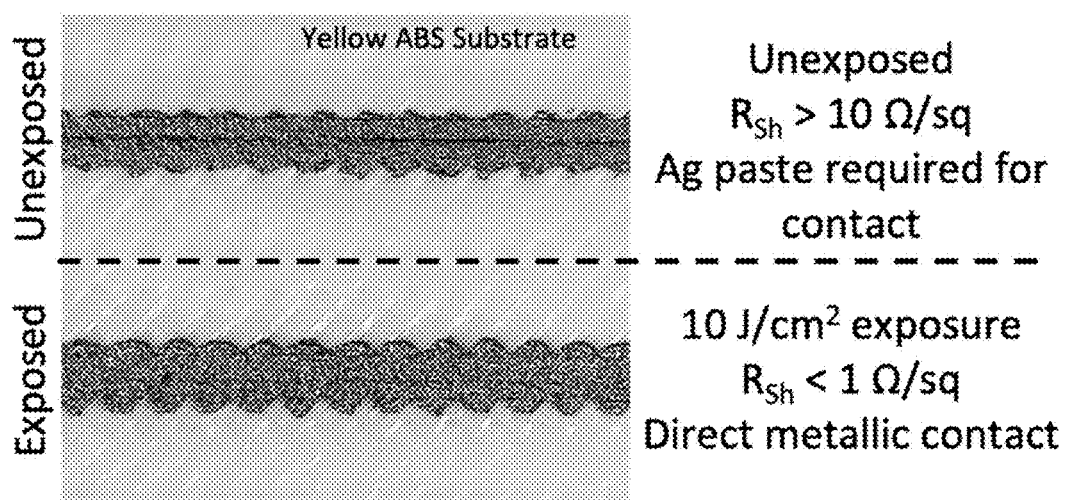
Figure 3
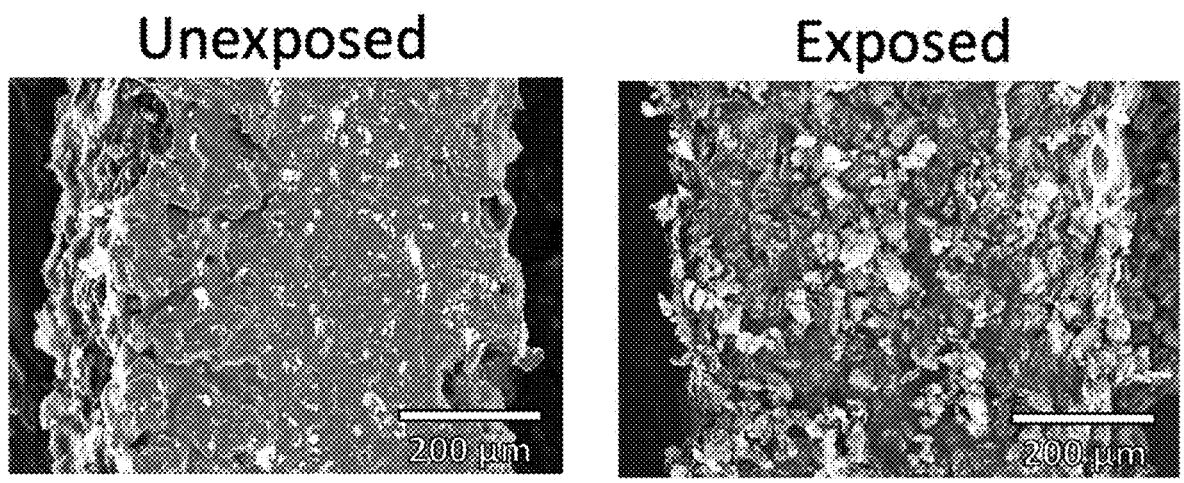
Figure 4A                              Figure 4B

PHOTONIC ANNEALING OF ELECTRICALLY-CONDUCTIVE THERMOPLASTICS

GOVERNMENT INTEREST

The invention described herein may be manufactured, used, and licensed by or for the United States Government.

BACKGROUND OF THE INVENTION

I. Field

The present invention relates generally to improving the properties of thermoplastics, and more particularly, to photonic annealing of electrically-conductive thermoplastics.

II. Description of Related Art

Additive manufacturing, also known as three-dimensional (3D) printing, is becoming more common for parts fabrication. It allows parts to be remotely manufactured quickly and on-demand, reducing reliance on conventional supply chain logistics. Fused filament fabrication (FFF) is one of the most common 3D printing technologies. It is a process of extruding melted thermoplastics to build a 3D part. FFF works by pushing thermoplastic filament through a heated nozzle to melt the plastic and extrude one layer at a time. Although widely used, one of the biggest limitations of FFF technology is the limited range of available materials. Most available 3D printers are limited to certain thermoplastics. With recent advancements in filament technologies, new composite filaments made by incorporating fillers such as carbon black or copper nanostructures into thermoplastics have allowed for the deposition of filaments with added material functionalities including electronic conductivity, using FFF technology.

Despite advancements, conventional 3D printed thermoplastic parts possess a number of non-ideal characteristics, such as low conductivity among others. Even electrically-conductive thermoplastic have low electrical conductivity, typically on the order of $10^3$ S/m or lower. This is significantly worse than most bulk metals used in electronics which have a conductivity on the order of about $10^7$ S/m. Their low conductivity greatly limits thermoplastics for use in a variety of electronic applications.

The conductivity of printed parts can be improved by electroplating, but this is user-intensive, time-consuming, and/or require external handling and processing away from the printer.

SUMMARY OF THE INVENTION

Novel photonic annealing of electrically-conductive thermoplastics is disclosed.

The photonic annealing can be used to improve part conductivity and also alter, enhance, or give rise to other material properties while taking significantly less time than other conventional post-process methods. For instance, before annealing, the baseline conductivity of the electrically-conductive thermoplastic material may be on the order of $10^3$ S/m or lower. After photonic annealing, its conductivity may be raised to be on the order of $10^4$-$10^5$ S/m or more. This represents an improvement of 10-100× or even more of conductivity of the electrically-conductive thermoplastic compared to electrically-conductive thermoplastic prior to the photonic annealing.

According to embodiments, a method of treatment comprises: photonic annealing electrically-conductive thermoplastic that forms, partially or wholly, a part. The electrically-conductive thermoplastic of the part may be formed by additive manufacturing. And non-conductive portion(s) of the part may also be formed by additive manufacturing. In some embodiments, the additive manufacturing comprises a fused filament fabrication (FFF) process.

According to other embodiments, an additive manufacturing apparatus for producing parts comprises: a deposition head configured to form a part, partially or wholly, from electrically-conductive thermoplastic by additive manufacturing; and a photonic annealing source configured to photonic anneal the electrically-conductive thermoplastic of the part formed.

The photonic annealing source may be in tandem with the deposition head in certain embodiments, or the photonic annealing source may be in-line with the deposition head in other embodiments. In the latter embodiments, the photonic annealing source may be mounted to, attached to, or otherwise connected to the deposition head. The in-line embodiments allow each printed layer of the part to be treated as it is deposited in a rapid and autonomous manner without significant time being added to the fabrication process.

The photonic annealing source may comprise: a flash lamp, a laser, or a UV light, as non-limiting examples. In operation, the photonic annealing source may be pulsed. The photonic annealing may comprise an exposure of at least a 2 J/cm² pulse having a pulse width of at least 4 ms. In some cases, the photonic annealing comprises multiple pulse exposures.

According to further embodiments, there is an enhanced part comprising an electrically-conductive thermoplastic, partially or wholly having been subjected to photonic annealing. The part may be an electronic part. For instance, it may comprise: an inductor, an antenna, a conductive electrode, a printed circuit board, a non-planar circuit, a 3D circuit, or a circuit embedded into a 3D-plastic part, as illustrative examples. Many other electrical components have the potential to be made as well.

Exemplary electrically-conductive thermoplastic used to form part may comprise: ABS (acrylonitrile butadiene styrene), PLA (polylactic acid), PCL (Polycaprolactone), OBC (olefin block copolymers) or polyester. To make conductive, electrically-conductive particles may be incorporated into the thermoplastic. Such particles may comprise carbon black or metallic nano- or micro-structures, for instance.

These and other embodiments of the invention are described in more detail below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments, including less effective but also less expensive embodiments which for some applications may be preferred when funds are limited. These embodiments are intended to be included within the following description and protected by the accompanying claims.

FIG. 3 is a photograph of an electrically conductive thermoplastic part comprised of two simple conductive traces formed by additive manufacturing showing effects of exposure to photonic annealing compared to non-exposure.

FIGS. 4A and 4B are scanning electron microscope (SEM) images of the unexposed and exposed traces shown in FIG. 3.

DETAILED DESCRIPTION

Figure 1:
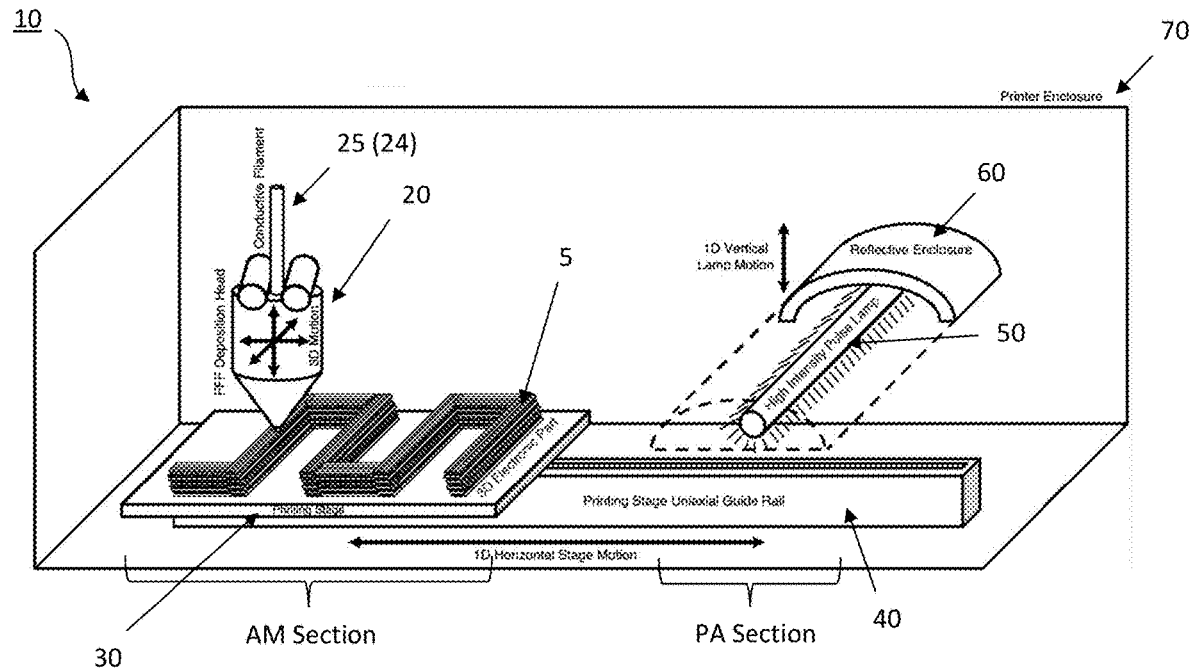
FIG. 1 is a schematic diagram of an additive manufacturing apparatus incorporating a photonic annealing source in tandem with a deposition head according to embodiments of the present invention.

Photonic annealing is used to treat electrically-conductive thermoplastic. The photonic annealing uses light to selectively heat to rapidly sinter or anneal the electrically-conductive thermoplastic material. A source of light is provided for photonic annealing. The light may be in the ultraviolet (UV), visible, and/or infrared (IR) wavelength region of the EM spectrum, for example.

According to embodiments, this technology can be used to improve part conductivity and also alter, enhance, or give rise to other material properties while taking significantly less time than other conventional post-process methods. While the inventors primarily investigated the effects of photonic annealing on improving electrical conductivity of electrically-conductive thermoplastics, other property alterations observed by them included heightened surface roughness and changes in color.

The technology described herein has been shown to rapidly improve/enhance the conductivity of electrically-conductive thermoplastic by an order of magnitude or more thus getting their conductivity closer to that of bulk metals. For instance, the baseline conductivity of thermoplastic material is consider low, i.e., typically on the order of $10^3$ S/m or lower. After photonic annealing, the conductivity may be raised to be the order of $10^4$-$10^5$ S/m or more. This represents an improvement of 10-100× or even more of conductivity of the electrically-conductive thermoplastic compared to electrically-conductive thermoplastic prior to the photonic annealing.

Since 3D printing is becoming more common, the technology opens 3D printing up to a far broader commercial market for on-demand printing of electronic parts. The parts formed may comprise: an inductor, an antenna, a conductive electrode, a printed circuit board, a non-planar circuit, a 3D circuit, or a circuit embedded into a 3D-plastic part, as illustrative examples. Many other electrical components have the potential to be made as well.

In some cases, a part may be formed, partially or wholly, of electrically-conductive thermoplastic, such as by additive manufacturing (3D printing process). Fused filament fabrication (FFF) is one exemplary additive manufacturing process which melts and deposits thermoplastic to form a part in one or more layers. The deposition of melted thermoplastics allows a part to be build layer-by-layer. Electrically-conductive thermoplastics are often just one component of an overall 3D printed part. In many cases, 3D-printed parts that utilize conductive thermoplastics do not necessarily have to be conductive as a whole. For example, a 3D printed part may include a printed conductive component portion (such as an electrode) that is embedded in an insulating 3D printed scaffold. Such a part would not be entirely conductive. But, the conductive component(s) formed of electrically-conducive thermoplastic can benefit from photonic annealing.

More, conductive thermoplastics have long been used in electromagnetic interference shielding and thermal dissipation applications. Although these applications are not necessarily excluded from additive manufacturing, they have traditionally existed outside of 3D printing. Photonic annealing of electrically-conductive thermoplastics could benefit these applications too. Additionally, photonic annealing of electrically-conductive thermoplastics could enhance parts manufactured through injection molding or enhance already established processes such as electroplating when carried out in conjunction.

Thermoplastics are polymer materials, which soften when heated and harden when cooled. If heated past their melting point, they melt to a liquid. They are distinct from thermoset materials, which also polymer materials, but irreversibly hardened by curing from one or more viscous liquid prepolymers or resins. Exemplary electrically-conductive thermoplastic may comprise: ABS (acrylonitrile butadiene styrene), PLA (polylactic acid), PCL (Polycaprolactone), OBC (olefin block copolymers) or polyester. To make conductive, electrically-conductive particles may be incorporated into the thermoplastic. Such particles may comprise 20-70% by weight of the electrically-conductive thermoplastic, for instance. They may comprise carbon black or metallic (e.g., silver, gold, nickel, copper, etc.) nano- or micro-structures. As an example, the electrically-conductive particles may comprise copper microflakes having an average diameter of about 50 μm.

It should be noted that the effect of the photonic annealing of electrically-conducive thermoplastic is different from photonic heating of thermoset polymers to cause resin to cure and/or, create cross-linking. The energy that is imparted on electrically-conductive thermoplastic from a photonic annealing source alters that thermoplastic's microstructure (e.g., texture, roughness), composition, and/or chemical structure in a manner that improves electrically conductivity. The degree of improvement may depend on a number of factors, such as the thermoplastic composition and light intensity, wavelength, etc.

The advantages of using photonic annealing sources (such as short processing times, autonomous) for heating thermoplastics stem from their ability to rapidly impart high energies on printed samples over very short periods of time in a non-contact, programmable manner. This photonic annealing, however, does not significantly alter the structural properties of the thermoplastic or the overall 3D printed part.

FIG. 1 is a schematic diagram of an additive manufacturing apparatus 10 incorporating a photonic annealing source in tandem with a deposition head according to embodiments of the present invention. The apparatus 10 may be referred to as a 3D printer. In general, it includes an additive manufacturing (AM) section, where a part 5 is initially formed, and a photonic annealing (PA) section where the part 5 is subjected to photonic annealing. The part 5 may be an electronic part, as previously mentioned.

In the AM section, the apparatus 10 produces parts 5 from electrically-conductive thermoplastic 24 using additive manufacturing (or 3D printing) in one or more layers. The electrically-conductive thermoplastic forms, partially or wholly, the part 5.

The apparatus 10 includes at least one deposition head 20 configured to apply/deposit melted thermoplastics to build the part 5 layer-by-layer. In the exemplary apparatus 10 shown, a fused filament fabrication (FFF) process is shown. The deposition head 20 may be comprised of a nozzle. Other additive processing (3D printing) methods may also be utilized. The printing resolution and layer thickness are constrained to the machine parameters and limitations.

In some embodiments, one or more additional deposition head(s) might be include, such as for applying/depositing electrically insulating, metallic, and/or dielectric materials. Whether placed manually and/or through automated means (such as with a parts grabber or picker), a wide-variety of pre-formed parts, such as integrated circuits (IC), motors, wiring, conduits, etc., can be installed or integrated with the part 5. Machining-process elements might further be provided (such as drills/taps for creating threaded holes). In these ways, a more-complex composite part 5 can be formed.

Various parts/elements in the AM section may be the same or similar as those used in commercially-available 3D printers which deposit and build part from thermoplastics by additive manufacturing process, such as FFF or the like.

The deposition head 20 is moveable. Preferably, it is configured to move in the three primary translational directions (e.g., X-, Y- and Z-axes) for 3D printing of parts and components layer-by-layer with high precision. Current 3D printing technology has a minimum resolution of about 20-50 microns in the X and Y directions and minimum layer thicknesses may range from about 15-150 microns in height (Z direction) which may be similarly used for embodiments of the apparatus 10. One or more additional degrees of freedoms (such as rotation motion about one of more of the primary axes, e.g., pitch, roll and yaw) could also be provided, up to, and possibly exceeding, 6 DOFs. The part 5 is initially built upon and supported on a printing stage 30. In some embodiments, the part 5 may be built up on a substrate (not shown) which is mounted or otherwise provided on the printing stage 30.

The electrically-conductive thermoplastic material 24 may be fed into the deposition head 20 as a conductive filament 25 to the deposition head 20. One electrically-conductive thermoplastic filament 25 is Electrifi available from Multi3D LLC. The exact composition is of this material is proprietary, although, it is known to be biodegradable polyester (thermoplastic) mixed with copper particles.

The filament 25 may be stored on a roll and feed with suitable rollers or other feeding means. A heater may be provided inside (or near) the head 20 that heats and/or melts the conductive thermoplastic material to sufficient viscosity for deposition.

The printing stage 30 in turn is mounted on guide rail 40 which allows the part 5 to move from the additive manufacturing (AM) section, where is it formed, to the photonic annealing (PA) section where the part is subjected to photonic annealing. The guide rail 40 may be a simple rail which allows the printing stage 30 uniaxial 1D horizontal stage motion between the two sections.

The photonic annealing source 50 is located in the PA section and is configured to selectively heat to rapidly sinter or anneal the electrically-conductive thermoplastic material of the part 5. As non-limiting examples, the photonic annealing source 50 may comprise: a flash lamp, a laser, or a light source. In some embodiments, a broad spectrum white light source (e.g., most or all wavelengths in the visible region of the EM spectrum, ~300-900 nm) may be used. The source 50 that is shown is a high-intensity lamp. One exemplary commercially-available lamp which may be used is the Pulseforge 1200 available from Novacentrix.

In operation, the photonic annealing source 50 may be pulsed. The photonic annealing may comprise an exposure of at least a 2 $J/cm^2$ pulse having a pulse width of at least 4 ms, as an example. In some cases, the photonic annealing includes multiple pulse exposures.

The inventors have demonstrated photonic annealing using this particular lamp with a flash power density of 3000 $W/cm^2$ in a 20 ms or less pulse duration. In this case, the total anneal time is the same as the pulse duration. The resulting photonic-annealed electrically-conductive thermoplastic may be at a 10× or more improvement in electronic conductivity, from which point it can then be printed on again to build up in 3D or used as a finished part. In some cases, the improvement in conductivity may be 100× or higher.

A reflective enclosure 60 having a reflective (or mirror) interior surface may be included on the side of the photonic annealing source 50 opposing the part 5. The reflective interior surface of the enclosure 60 may have a parabolic profile to better collimate and focus light onto at least a portion of the part 5. The stage 30 may be moved along guide rail 40 to ensure that all portions comprising the electrically-conductive thermoplastics are photonic annealed.

The photic annealing source 50 and/or the reflective enclosure 60 may be mounted on stage (not shown) to permit their motion. The stage may provide 1D vertical motion, for instance. Although, additional DOFs could also be provided by the stage.

An enclosure 70 may be further provided to prevent dust, dirt, fod or other debris from interfering with the additive manufacturing (3D printing process). The enclosure 70 may include one or more transparent portions (e.g., formed of glass or plastic) allowing an operator to peek or look inside the apparatus 10. If a high-intensity light photonic annealing source 50 is included, the enclosure 70 should also have the capability of being completely opaque, at least during operation, since its light could potentially be harmful or blinding to the operator.

Operation of the apparatus 10 (or apparatus 10' of FIG. 2) can be controlled be a suitable controller (not shown). The controller may be a computer or microprocessor, for instance, that includes computer-executable code which when executed is configured to control the apparatus 10 (or apparatus 10'). The controller handles both the 3D printing of the part 5 and photonic annealing of the electrically-conductive thermoplastic portions of the part 5.

These aforementioned elements of apparatus 10 are merely exemplary and it should be appreciated that other elements are certainly useable. Indeed, the apparatus 10 can include any suitable 3D printer (e.g., FFF printer) for depositing of the electrically-conductive thermoplastic material, any suitable filament for supply the electrically-conductive thermoplastic material to the printer, and/or any suitable photonic annealing source for treating the electrically-conductive thermoplastic material.

Figure 2:
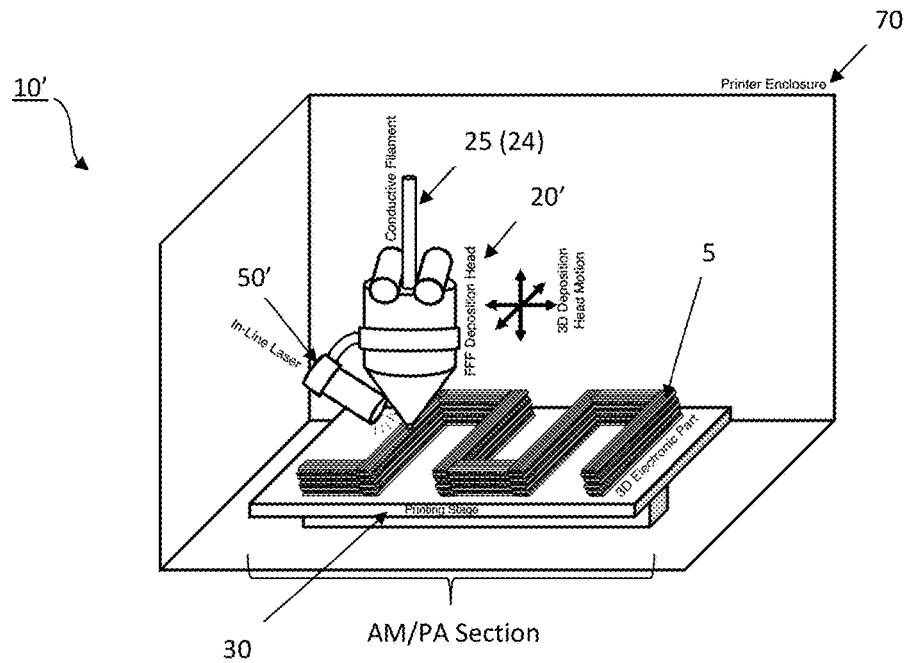
FIG. 2 is a schematic diagram of an additive manufacturing apparatus incorporating an in-line photonic annealing source with a deposition head according to embodiments of the present invention.

FIG. 2 is a schematic diagram of an additive manufacturing apparatus 10' incorporating an in-line photonic annealing source with a deposition head according to embodiments of the present invention. Apparatus 10' may be also referred to as a 3D printer. Many of the elements of apparatus 10' are common or similar to that of the previous apparatus 10 and may not be further discussed in detail.

A key difference from the previous apparatus 10, is that the in-line photonic annealing source 50' may mounted to, attached to, or otherwise connected to the deposition head 20' in apparatus 10'. As shown, the in-line photonic annealing source 50' may be a laser; but various other light sources may be used as discussed herein.

Because the deposition head 20' is connected to the in-line photonic annealing source 50', the additive manufacturing (AM) section and the photonic annealing (PA) section are essential the same. The photonic annealing source 50' moves with the deposition head 20'. This arrangement allows each printed layer of the part 5 to be treated as it is deposited in a rapid and autonomous manner without significant time being added to the fabrication process. Alternatively, the photonic annealing source 50' could be mounted on another structure, which permits it to move along with the deposition head 20'.

FIG. 3 is a photograph of an exemplary FFF-printed electrically conductive thermoplastic part, showing effects of exposure to photonic annealing compared to non-exposure. This part consists of two simple conductive traces. One of the traces was exposed to photonic annealing; the other remained unexposed.

The electrically-conductive thermoplastic material was a commercially-available FFF filament material, Electrifi available from Multi3D LLC, previously discussed. The part was 3D printed onto a substrate. The printed material thickness is 0.3 mm in total and was printed at a layer height of 0.1 mm. The substrate was formed of yellow ABS. After printing, the part was exposed to high intensity light from a flashlamp with lamp output energy of 10 J/cm² and pulse width of 4 ms.

The resistivity of the unexposed region is high, i.e., $R_{sh}$>10 Ω/sq. Conventional silver (Ag) paste will be required for electrical contact as is typically used for this purpose. On the other hand, the region exposed to the photonic annealing is physically altered. The exposed region has a much improved resistivity, $R_{sh}$<1 Ω/sq. It is sufficiently conductive with direct metallic contact. No conductive paste is, or will be, necessary.

FIGS. 4A and 4B are scanning electron microscope (SEM) images of unexposed and exposed traces, respectively, of the part shown in FIG. 3. As should be apparent, the exposed trace has as altered surface morphology compared to the unexposed trace. Indeed, there is increased surface roughness (visible to the eye). Alterations in the material's color as a result of the photonic annealing are also clearly visible.

Figure 5:
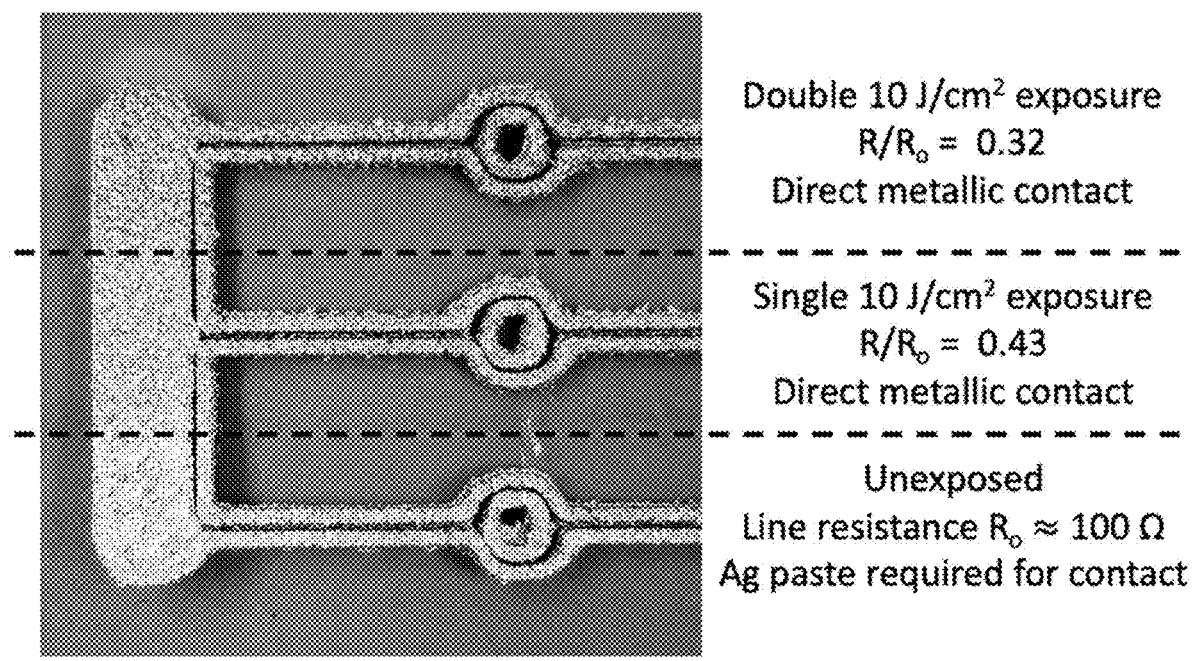
FIG. 5 is a photograph of another electrically conductive thermoplastic part comprised of three conductive traces extending from a common body portion formed by additive manufacturing showing effects of exposure to photonic annealing compared to non-exposure.

FIG. 5 is a photograph of another electrically conductive thermoplastic part showing effects of exposure to photonic annealing compared to non-exposure. This part has three conductive traces extending from a common body portion. Two of the traces were exposed to photonic annealing of varying degrees; the third remained unexposed.

This part also was made by FFF printing from the commercially-available electrically-conducuve thermoplastic filament, Electrifi from Multi3D LLC, previously discussed. The film thickness is 1 mm in total and was printed at a layer height of 0.1 mm. The substrate was formed of polyimide. After printing, the part was exposed to high intensity light from a flashlamp with lamp output energy of 10 J/cm² and pulsewidth of 4 ms.

The unexposed trace is at the bottom of the part. It has a line resistance of approximately 100Ω. Conventional silver (Ag) paste will be required for electrical contact as is typically used for this purpose. By contrast, the traces exposed to the photonic annealing at the top and middle of the part are physically altered to improve the electrical conductivity. The trace in the middle was subject to 10 J/cm² exposure to the photonic annealing source, and the top trace was double-exposed at the same intensity. Both of the exposed traces have metallized surfaces for stable electrical contact. No conductive paste is, or will be, necessary. The measured line resistance (R/Ro) of the top and middle traces are 0.32, and 0.43, respectively. A greater conductively improvement follows from the increase of photonic annealing exposure energy and time, or reducing film thickness. Electrical conductivity was measured as a function of exposure energy density.

Figure 6:
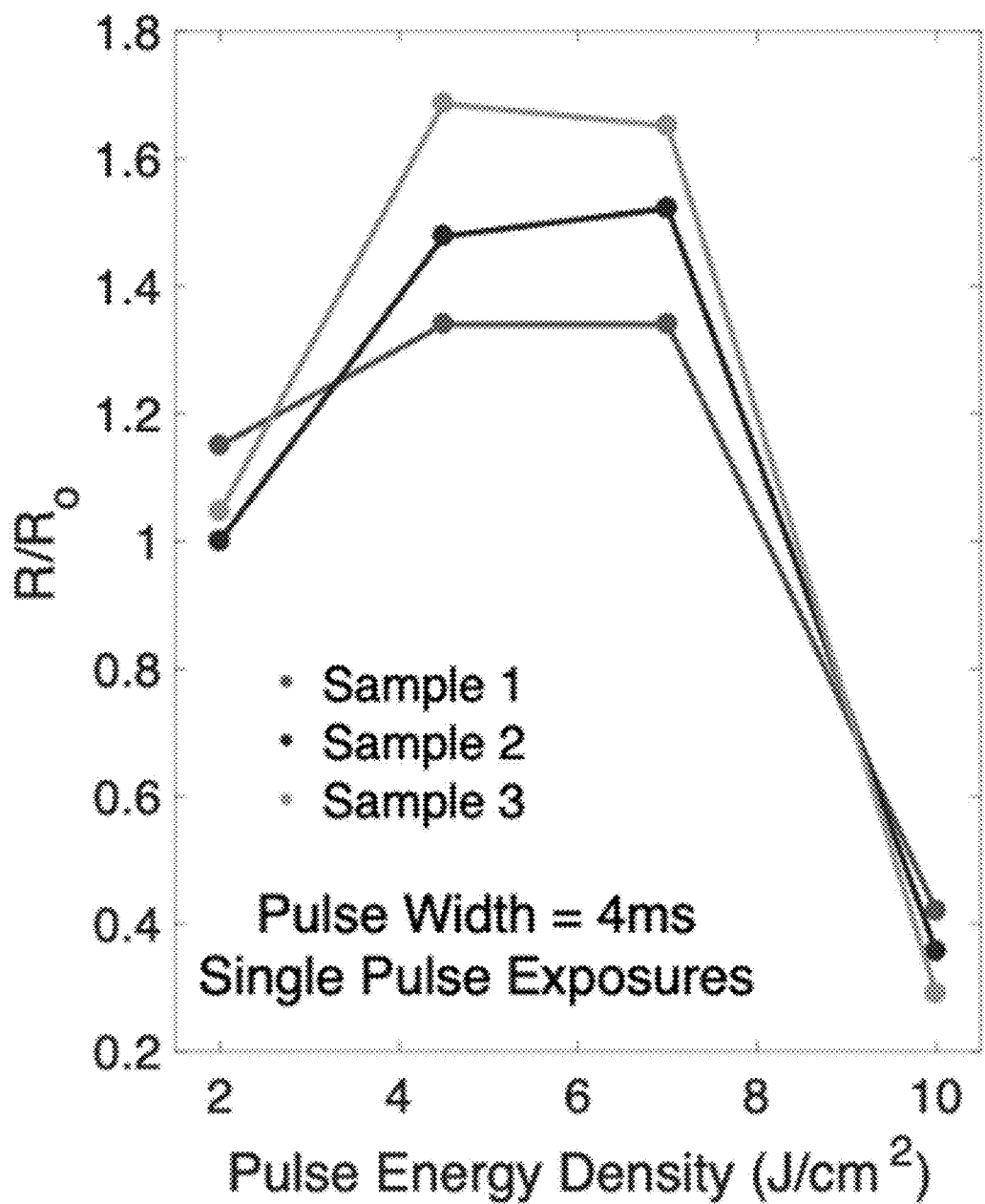
FIG. 6 is a plot showing measured line resistance as a function of single pulse exposure energy density for three samples.

FIG. 6 is a plot showing measured line resistance ($R/R_o$) as a function of single pulse exposure energy density (J/cm²) for three samples. Samples 1, 2, and 3 were printed one after another using the same conditions. Each sample was printed using the same material and 3D printing process (discussed above with respect to FIG. 5). They had a thickness value of about 1 mm. The samples were then exposed to single pulses of photonic annealing. The exposure process consisted of a 2 J/cm² pulse, then 4.5 J/cm², then 7 J/cm², then a 10 J/cm² pulse, with each pulse having a pulse width of 4 ms. Resistance measurements were carried out in between exposures, and shown in the plot. Resistance is inversely proportional to conductivity.

The samples show a similar response to various exposure conditions, indicating low process variability. The data shows that line resistance values were exacerbated at lower energy density exposures, but improved at high energy density exposures. Moreover, 10× improvements in conductivity were achieved when using multiple consecutive high-energy density exposures. Up to five exposures have been used to make further improvements in some cases, however, it has been found that using longer pulsewidths (e.g., up to 20 ms) have resulted in greater improvements.

Figure 7:
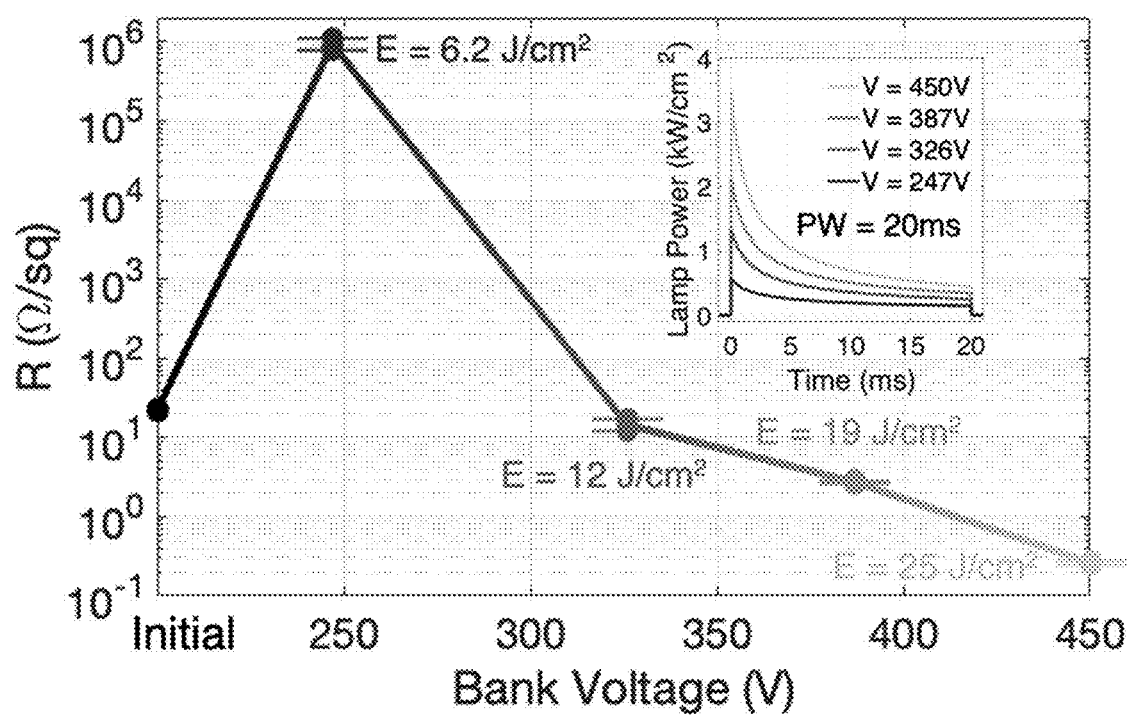
FIG. 7 shows plotted data from other experiments using a flashlamp as the photonic annealing source.

FIG. 7 shows data collected from other experiments using a flashlamp as the photonic annealing source. In the main plot, bank voltage shown on the x-axis is related to the energy density released from the flashlamp. Corresponding energy densities are also shown in the plot. Four different exposure energy densities (corresponding to bank voltages of 247V, 326V, 387V, and 450V) were used, with three samples being tested at each point. "Initial" as it is indicated on the X-axis represent three samples that were unexposed. 15 total samples were evaluated. Error bars indicate standard deviation between data points. The data shows up to a 100× improvement (decrease) in film resistance. The inset plot shows the power density emitted from the flashlamp over its pulse width, which in this case was 20 ms. The thermoplastic films in this case were 0.3 mm thick.

It is noted that aspects of this invention have been previously included in a poster titled "Flash Ablation Metallization of Conductive Thermoplastics" that was displayed at the Flex2020 Conference and Exhibition held in San Jose, CA, on 24-27 Feb. 2020. It is herein incorporated by reference in its entirety for all purposes.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

We claim:

1. A method comprising:
    forming by depositing, partially or wholly, a part from an electrically-conductive thermoplastic consisting of a thermoplastic having metallic particles uniformly mixed in the thermoplastic when deposited having an initial electrical conductivity of 1000 S/m or lower; and
    increasing the electrical conductivity of at least a portion of the deposited part from 1000 S/m or lower to $10^4$-$10^5$ S/m or more by photonic annealing said at least a portion of the part using visible light at an exposure energy density of at least 8.4 J/cm$^2$.

2. The method of claim 1, wherein the deposited electrically-conductive thermoplastic consisting of the thermoplastic having the metallic particles uniformly mixed in the thermoplastic of the part is formed by additive manufacturing.

3. The method of claim 2, further comprising forming non-conductive portion(s) of the part by additive manufacturing.

4. The method of claim 2, where the additive manufacturing comprises a fused filament fabrication (FFF) process.

5. The method of claim 1, wherein the photonic annealing comprises multiple exposures.

6. The method of claim 1, wherein the part formed comprises: an inductor, an antenna, a conductive electrode, a printed circuit board, a non-planar circuit, a 3D circuit, or a circuit embedded into a 3D-plastic part.

7. The method of claim 1, wherein the thermoplastic is selected from the group consisting of: PLA (polylactic acid), PCL (Polycaprolactone), OBC (olefin block copolymers) and polyester.

8. A method comprising:
    depositing, partially or wholly, a part from an electrically-conductive thermoplastic consisting of a thermoplastic having metallic particles uniformly mixed in the thermoplastic when deposited; and
    increasing the electrical conductivity of at least a portion of the deposited part to at least $10^4$ S/m or more by photonic annealing said at least a portion of the part using visible light at an exposure energy density of at least 8.4 J/cm$^2$
    wherein the thermoplastic is selected from the group consisting of: PLA (polylactic acid), PCL (Polycaprolactone), OBC (olefin block copolymers) and polyester, and
    the metallic particles are selected from the group consisting of: silver, gold, nickel and copper.

9. The method of claim 1, wherein the metallic particles are selected from the group consisting of: silver, gold, nickel and copper.

10. The method of claim 1, wherein the metallic particles are 20-70% by weight of the electrically-conductive thermoplastic.

11. The method of claim 1, wherein the electrically-conductive thermoplastic consisting of the thermoplastic having the metallic particles uniformly mixed in the thermoplastic is filament of a biodegradable polyester mixed with copper particles.

12. The method of claim 1, wherein the initial electrical conductivity is greater than 0 S/m.

13. The method of claim 1, wherein the exposure energy density of the photonic annealing is 8.4-25 J/cm$^2$.

* * * * *